(12) United States Patent
Abreu

(10) Patent No.: US 11,455,470 B2
(45) Date of Patent: Sep. 27, 2022

(54) DISTRIBUTED REACTIVE STREAMING MICROSERVICES ARCHITECTURE WITH SELF-MANAGEMENT AND AUTONOMOUS ROUTING

(71) Applicant: Raul Abreu, Hong Kong (HK)

(72) Inventor: Raul Abreu, Hong Kong (HK)

(73) Assignee: Raul Abreu, Hong Kong (HK)

( * ) Notice: Subject to any disclaimer, the term of this patent is extended or adjusted under 35 U.S.C. 154(b) by 396 days.

(21) Appl. No.: 16/798,443

(22) Filed: Feb. 24, 2020

(65) Prior Publication Data

US 2021/0264114 A1     Aug. 26, 2021

(51) Int. Cl.
*G06F 40/30*     (2020.01)
*G06N 3/04*     (2006.01)

(52) U.S. Cl.
CPC .............. *G06F 40/30* (2020.01); *G06N 3/04* (2013.01)

(58) Field of Classification Search
CPC .................................. G06F 40/30; G06N 3/04
See application file for complete search history.

(56) References Cited

U.S. PATENT DOCUMENTS

| 8,600,726 | B1* | 12/2013 | Varshney | G06F 9/455 703/27 |
| 11,074,065 | B2* | 7/2021 | Criscuolo | G06F 8/30 |
| 2011/0271289 | A1* | 11/2011 | Weiser | G06F 9/547 719/317 |
| 2014/0033071 | A1* | 1/2014 | Gruber | G06Q 10/1097 715/752 |
| 2017/0193017 | A1* | 7/2017 | Migliori | G06F 16/1724 |
| 2017/0364346 | A1* | 12/2017 | Peng | G06F 13/4068 |
| 2018/0035294 | A1* | 2/2018 | Reunamäki | H04W 12/08 |
| 2018/0307549 | A1* | 10/2018 | Li | H04L 41/5054 |
| 2020/0097247 | A1* | 3/2020 | Molina | G06F 16/26 |
| 2020/0128063 | A1* | 4/2020 | Griffin | H04L 69/22 |
| 2020/0202025 | A1* | 6/2020 | Le Buhan | G06F 21/10 |
| 2020/0364009 | A1* | 11/2020 | Costa Majo | G06F 3/1229 |
| 2021/0264114 | A1* | 8/2021 | Abreu | G06N 3/04 |
| 2021/0303578 | A1* | 9/2021 | Dua | G06F 16/2228 |
| 2021/0303636 | A1* | 9/2021 | Dua | G10L 15/22 |

\* cited by examiner

*Primary Examiner* — Kevin Ky
(74) *Attorney, Agent, or Firm* — Idea Intellectual Limited; Margaret A. Burke; Sam T. Yip

(57) ABSTRACT

A method for building a distributed reactive streaming microservices architecture having a decentralized, self-managed, and autonomous data message routing mechanism. The method comprises processing of data message by multiple microservices and generating routing patterns in the form of a fingerprint in response to the message-processing by the microservices. As the message is input into the microservices architecture, a fingerprint of the message is generated, wherein the fingerprint may comprise a payload flag in which payload information is embedded. A first microservice is triggered by recognizing the payload flag. As the message is processed by the first microservice, the fingerprint is updated by appending a first flag to the payload flag. The message with the updated fingerprint is subsequently recognized by a second microservice. As such, the routing of the message is accomplished by the changing fingerprint being recognized by the desired microservices to be triggered.

18 Claims, 12 Drawing Sheets

DISTRIBUTED REACTIVE STREAMING MICROSERVICES ARCHITECTURE WITH SELF-MANAGEMENT AND AUTONOMOUS ROUTING

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to the field of distributed streaming platforms and microservices architecture in information technology infrastructures. More specifically, the present invention relates to distributed streaming techniques for enabling a reactive microservice architecture with self-management and autonomous data message routing.

BACKGROUND OF THE INVENTION

Microservices, which can be written in different programming languages and applied for information processing in different fields, are attracting much attentions recently. Multiple microservices are arranged and used to build a scalable microservice architecture to enable an application with a suite of services, each running in its own process and independently deployable with connection via application programming interfaces (APIs). For example, microservices can be built to provide Natural Language Processing (NLP) services, aiding computer processors to analyze, understand, and derive meanings from the human language in an efficient fashion, and to organize and structure knowledge to build a conversational artificial intelligence (AI) platform. Other examples include facial recognition services, cryptography applications, e-commerce and financial transaction processing and analytics applications.

In order to handle a myriad of microservice requirements, microservice orchestration is one of the conventional techniques. In microservice orchestration, there is typically a controller that acts as an "orchestrator" to manage all microservice interactions, transmit events and respond to them. For example, if multi-microservices are required to process an event in a specific order, the orchestrator generates an invocation to each microservice based on the specific order and then wait for a response before invoking the next microservice.

Although microservice orchestration provides a good way for controlling the execution flow of microservices where there is a synchronization requirement, if during processing one of microservices is down, all other microservices will be blocked, and the processing stops. For example, if a conversational AI platform is programmed by microservice orchestration, a conversation between a user and the platform would stop when the microservice orchestration fails or is overloaded. Moreover, since microservice orchestration involves diffused process orchestration, it is difficult to manage in a large scale deployment. Therefore, there is a need in the art for a new efficient, fault-tolerant, and scalable approach of managing and organizing microservices in building a microservice architecture.

SUMMARY OF THE INVENTION

In accordance with one aspect of the present invention, a method for processing a message by a distributed reactive streaming microservice architecture is provided in the following process steps. Payload information is generated in response to an input data message using a processing server system comprising one or more processing servers. A payload flag in which the payload information is embedded is generated by the processing server system, so to generate a 'fingerprint' of the data message comprising the payload flag. A first service is provided by a first microservice using the processing server system, in which the first microservice is triggered by recognizing the payload flag. After the microservice processes the data message, the fingerprint is updated by adding a first flag appearing after the payload flag. A response to the message is outputted using the processing server system after updating the fingerprint at least once.

In accordance with another aspect of the present invention, an apparatus for processing a data message by a distributed reactive streaming microservice architecture is provided and includes a processing server system. The processing server system is configured to generate a payload information in response to an input data message. The processing server system is further configured to generate a payload flag in which the payload information is embedded, so as to generate a fingerprint of the message comprising the payload flag. The processing server system is further configured to provide a first service by a first microservice, in which the first microservice is triggered by recognizing the payload flag. The processing server system is further configured to update the fingerprint by adding a first flag appearing after the payload flag. The processing server system is further configured to output a response to the message after updating the fingerprint at least once.

By using this reactive microservice architecture, there is no need for an orchestrator to handle microservice interactions, thus no more blocking or waiting that happens in microservice orchestration, and there is no single/multi-point of failure. In the present invention, the reactive microservice architecture allows the multiple microservices to consume the same message and whether or not to process the message depending on the fingerprint of the message. The fingerprint of the message is updated iteratively as it is processed by the microservice by, for example, appending a corresponding flag to the fingerprint. Therefore, by changing the fingerprint of the message as it is being processed by different microservices, the invocation/triggering/activation of the desired microservices to process the message and in turn the logical processing flow of the message are maintained. And since the microservices can be invoked, triggered, or activated by recognizing the corresponding flag(s) of the fingerprints of the messages, massive parallel processing of messages is possible, which is also advantageous in enabling self-management and autonomous routing in the message-processing platform.

BRIEF DESCRIPTION OF THE DRAWINGS

Embodiments of the invention are described in more detail hereinafter with reference to the drawings, in which.

DETAILED DESCRIPTION

In the following description, methods and apparatuses for achieving decentralized, self-managed, and autonomous message routing in a distributed reactive streaming microservices architecture, and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

The present invention provides the methods and apparatuses for building a distributed reactive streaming microservices architecture having a decentralized, self-managed, and autonomous data message routing mechanism, which can be used for building a variety of computing applications. Such computing applications include, but not limited to, NLP applications, AI chatbot, facial recognition applications, cryptography applications, e-commerce and financial transaction processing and analytics applications, other AI and non-AI based applications. In accordance with various embodiments of the present invention, provided is a method that processes at least one message (or message stream) by microservices and generates routing patterns in the form of a fingerprint associated with the message in response to the message-processing by the microservices.

In the following description, an exemplary NLP message-processing platform is used to illustrate the working principle of the present invention. Particularly, it describes how the NLP message-processing platform can be implemented using the distributed reactive streaming microservices architecture having a decentralized, self-managed, and autonomous message routing mechanism in accordance to various embodiments of the present invention. An ordinarily skilled person in the art will appreciate that other implementations of other AI and non-AI applications using the distributed reactive streaming microservices architecture are possible without undue experiment or deviation from the spirit of the present invention.

Figure 1:
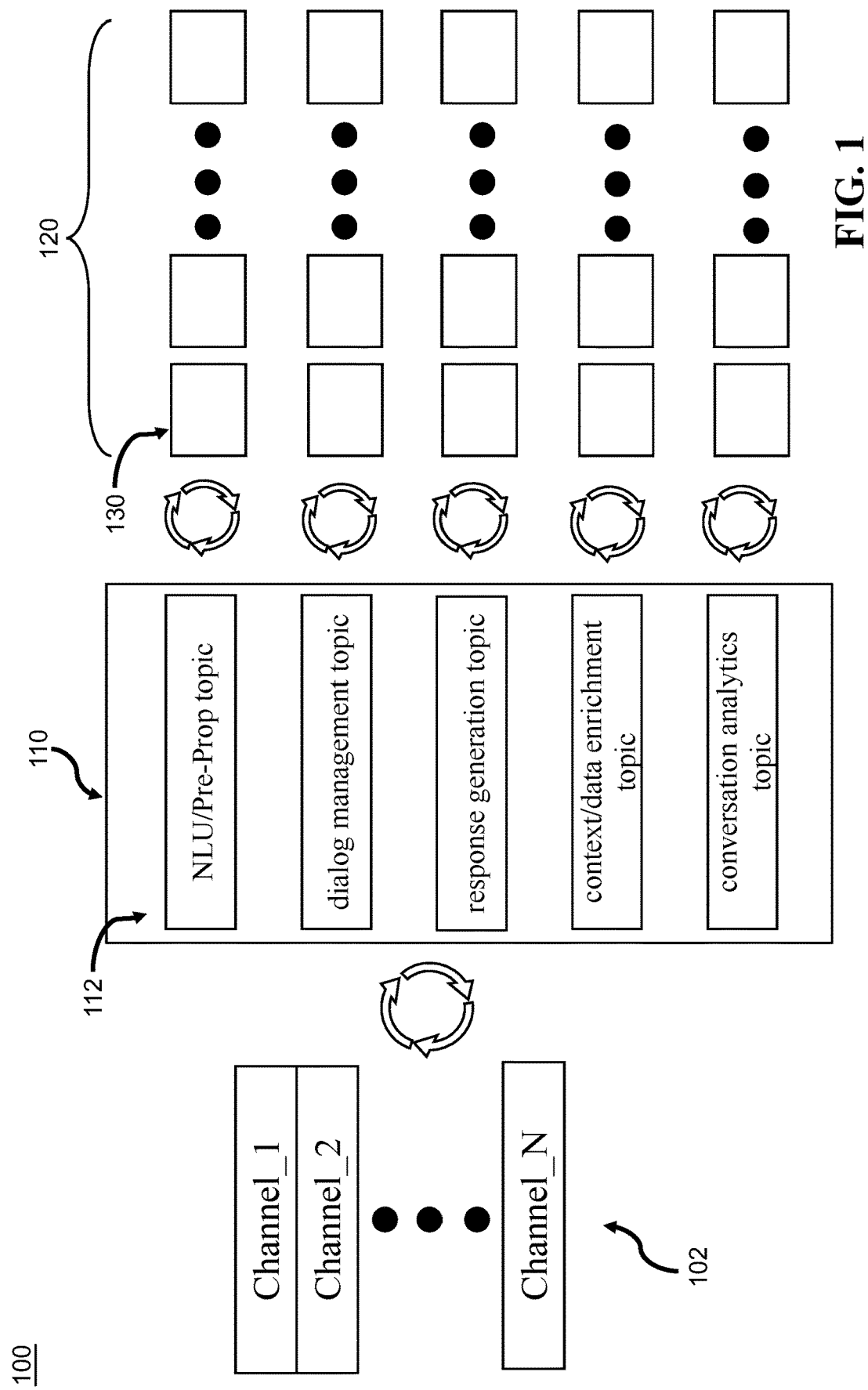
FIG. 1 illustrates a simplified logical structure of an exemplary NLP message-processing platform for processing messages using a reactive microservice architecture in accordance with a first embodiment of the present invention.

FIG. 1 illustrates a simplified logical structure of an exemplary NLP message-processing platform 100 for processing messages using a reactive microservice architecture in accordance with a first embodiment of the present invention.

The message-processing platform 100 may be implemented by a processing server having at least one specially configured computer processor or a processing server system comprising a cluster of more than one processing servers. These include workstations, computing clusters, server farms, Cloud servers, the likes, and combinations thereof. In various embodiments, portions or the entirety of the message-processing platform 100 may be implemented by separate physical and/or virtual machines configured to communicate with each other by wired or wireless connections. The message-processing platform 100 can be applied as a conversational AI application that interacts visually, textually, and/or verbally with a human user. The message-processing platform 100 may communicate and interact with multiple users via channels 102 (e.g. channel_1, channel_2, and channel_N). That is, there can be multiple parallel streams of incoming messages, and a number (e.g. thousands) of conversations from multiple users being conducted by the message-processing platform 100 at the same time. Forms of the messages exchanged between channels 102 and the users may include text, voice, video, and combinations thereof. In one embodiment, the message-processing platform 100 may convert the messages received from the channels 102 by binary serialization.

The message-processing platform 100 allows messages to be generated, modified, identified, and classified based on a number of topics 112 (i.e. Kafka topics under the Apache Kafka® streaming platform) in a topic collection 110. For example, when a message is inputted into the message-processing platform 100, the message may be routed to the corresponding topic 112 and the message is processed in respond to the topic 112. In the exemplary illustration of FIG. 1, the topic collection 110 may contain a NLU/pre-processing (NLU/Pre-Prop) topic, a dialog management topic, a response generation topic, a context/data enrichment topic, and a conversation analytics topic. The present invention is not limited thereto. In other embodiments, other suitable topics may be contained in the topic collection 110.

The message-processing platform 100 processes the messages by a microservice collection 120 comprises a plurality of microservices 130 that are implemented by separate physical and/or virtual machines that collectively serve as a processing server system. The microservices 130 may also be implemented as software components. The microservices 130 analyze and process the messages, wherein the processing of the messages may include updating the message, generating new message, or modifying existing message according to the analysis. In one embodiment, the processing of the microservices 130 is performed in real-time. For example, an application comprising the microservices 130 may be configured to receive an input text/voice message containing information of a conversation and to generate an instant output text/voice message in response to the information.

In accordance with one embodiment, various microservices 130 are provided for different functional services depending on the topics 112 of the topic collection 110. For example, pre-processing microservices, NLU microservices, NLU decision microservices, natural language generation microservices, and neural end-to-end microservices may be applied and routed to the NLU/Pre-Prop topic. Dialog management microservices may be applied and routed to the dialog management topic. Context/data enrichment topic microservices may be applied and routed to the context/data enrichment topic. Response generation topic microservices may be applied and routed to the response generation topic. Response channel topic microservices may be applied and routed to the response channel topic. On-premises analytics software and Cloud-based analytics services, such as SPARK', Google® Cloud Platform (GCP) dataflow, GCP bigquerey, may be applied to the conversation analytics topic. The present invention, however, is not limited thereto. In other embodiments, other suitable functional microservices can also be applied.

When a user feeds an input message to the message-processing platform 100, the input message is processed by at least one of the microservices 130 to generate an output message, then the output message is output to the user. Logs of the responses to the processing microservices 130 are recorded as routing patterns, which can be used to generate a fingerprint of the interim data message (during the processing between the input message and the output message) as it is being routed to different microservices 130. In this regard, during the processing of the interim data message, in each instance that a microservice executes to process the interim data message, the fingerprint of the interim data message is updated and serve as a recognition pattern for the next microservice, which means the interim data message can be routed to the correct topic for subsequent processing and trigger the corresponding microservice based on the updated fingerprint thereof. The following description is provided to further explain in more details the concept of the fingerprint.

Figure 2:
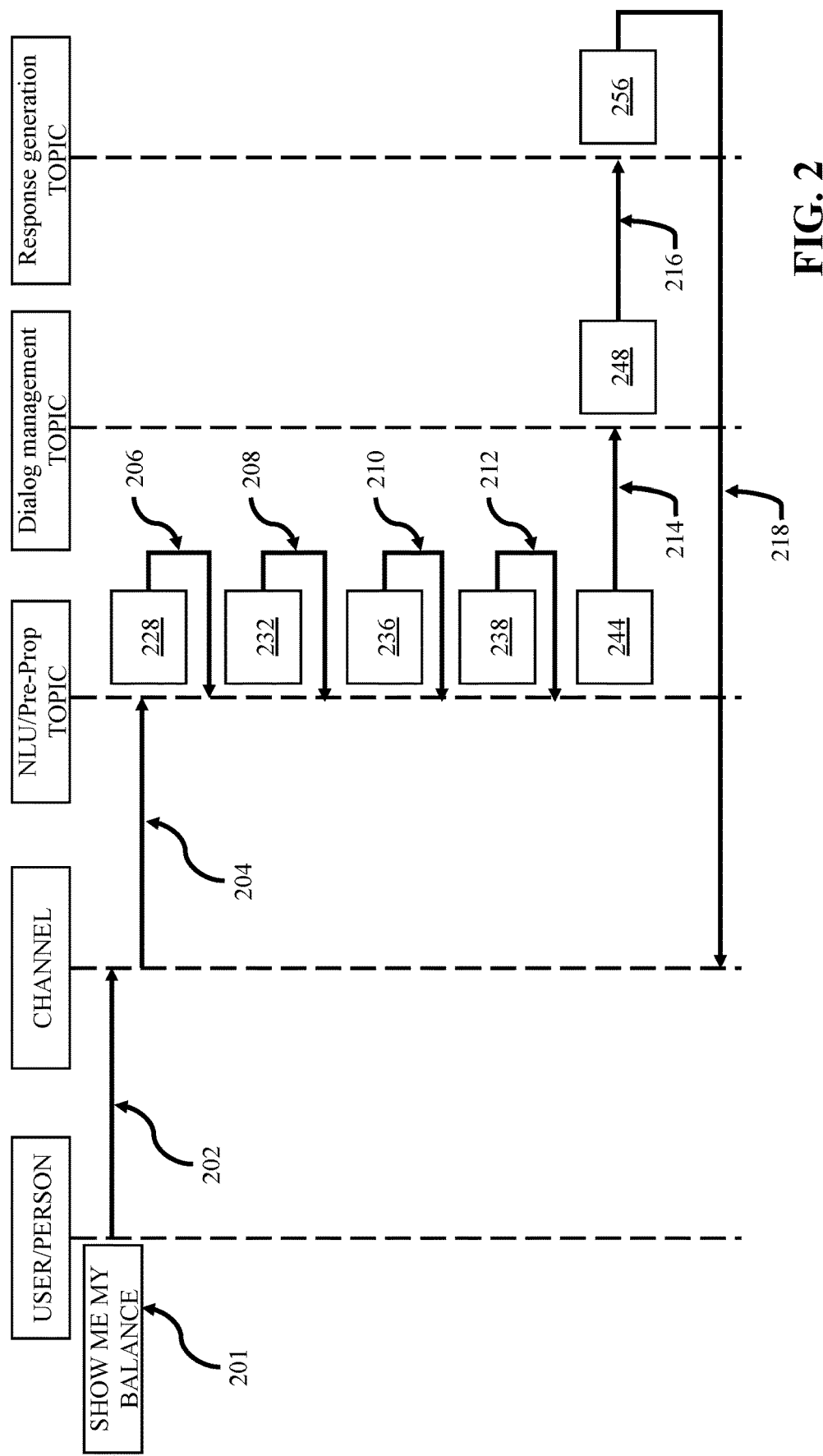
FIG. 2 is a sequence diagram for processing a message under the reactive microservice architecture according to the first embodiment of the present invention.

FIG. 2 illustrates the processing of a message under the distributed reactive microservice architecture according to the first embodiment of the present invention. In the exemplary illustration of FIG. 2, processing steps may be reorganized for parallel execution, or reordered according to different technical and business requirements. The processing steps comprise steps 202, 204, 206, 208, 210, 212, 214, 216, and 218.

Figure 3:
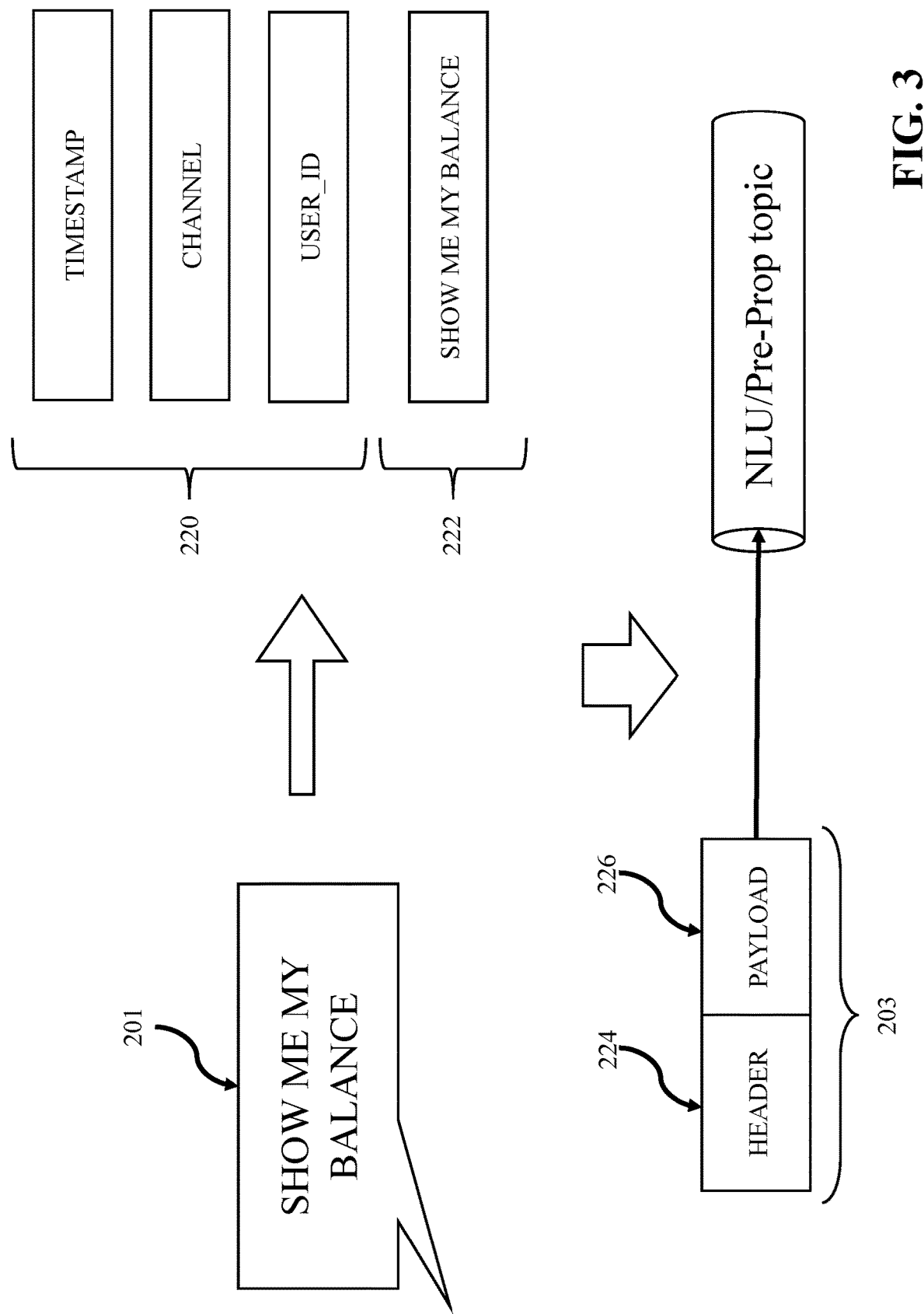
FIG. 3 illustrates the generation of header information and payload information under the reactive microservice architecture according to the first embodiment of the present invention.

Referring to FIGS. 2 and 3, in which FIG. 3 illustrates the execution of step 204 to generate header information 220 and payload information 222. In step 204, a decoding process is executed to preliminarily generate header information 220 and payload information 222 in response to the message 201. The header information 220 contains identification data carried by the message 201, such as timestamp, channel address, user ID, or other identification data. The payload information 222 contains the utterance of the message 201, such as "show me my balance". After the decoding process, a header flag 224 in which the header information 220 is embedded and a payload flag 226 in which payload information 222 is embedded are generated in a fingerprint 203 of the message 201, in which the payload flag 226 appears after the header flag 224.

In one embodiment, the fingerprint 203 of the message 201 is generated at the same time that the header flag 224 and the payload flag 226 are generated. The header information 220 and the payload information 222 can collectively serve as an immutable part of the fingerprint 203 of the message 201. Herein, the "immutable part" means that this part is to include only the header flag 224 and the payload flag 226 with the header information 220 and the payload information 222. Any flag added into the fingerprint 203 of the message 201 in the subsequent processes is contained in a different part. As the message 201 is routed to the NLU/Pre-Prop topic of the topic collection (e.g. the topic collection 110 of FIG. 1), the fingerprint 203 thereof with the immutable part is recognized by the corresponding microservices, thereby be processed by those microservices.

Figure 4:
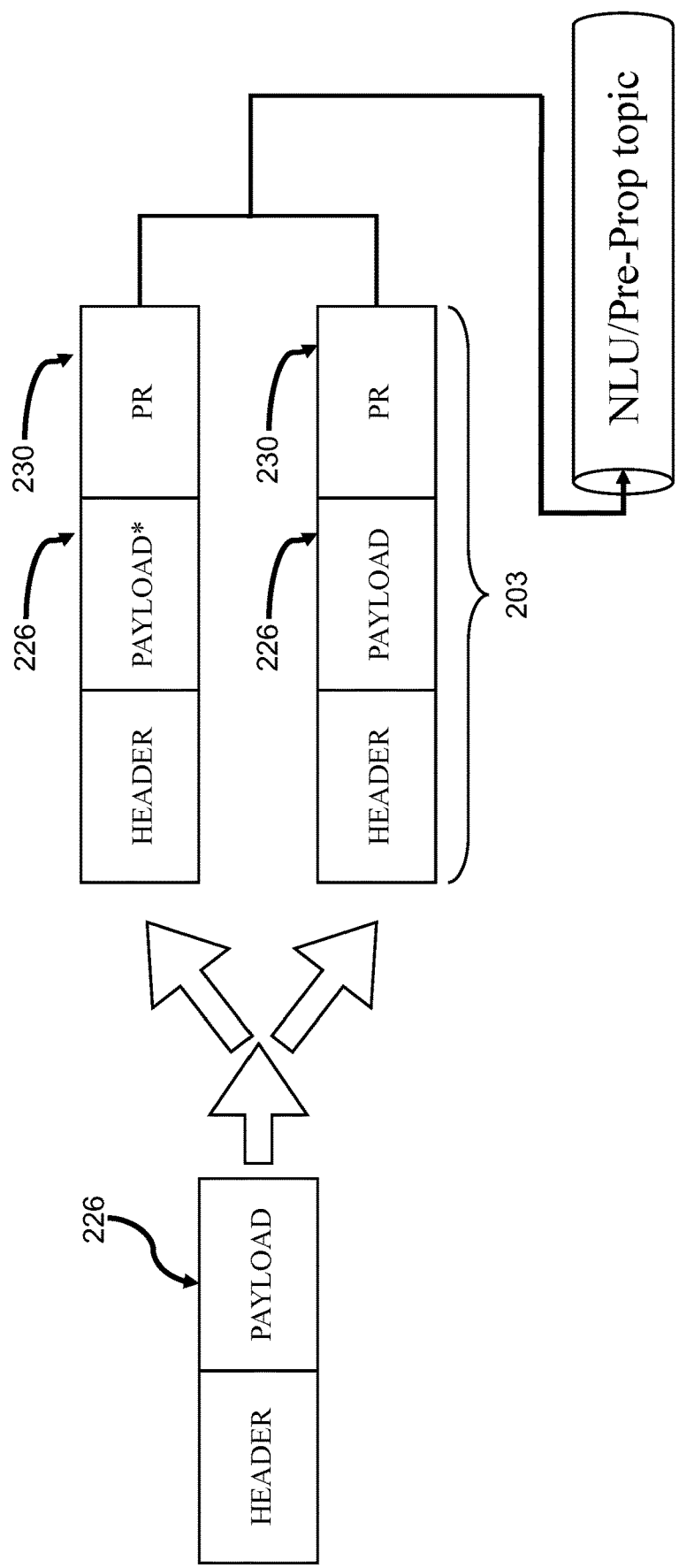
FIG. 4 illustrates the processing of the message by a pre-processing microservice under the reactive microservice architecture according to the first embodiment of the present invention.

Referring to FIGS. 2 and 4, in which FIG. 4 illustrates step 206 for processing the message by a pre-processing microservice 228. In step 206, the pre-processing microservice 228 is configured to check whether to modify the payload information embedded in the payload flag 226. In one embodiment, the pre-processing microservice 228 is executed to fix any typo or filter punctuation (e.g. comma, dash, or the likes) in the payload information. If there is any typo to be fixed or punctuation to be filtered, the pre-processing microservice 228 modifies the payload, and subsequently the payload information generated in step 204 is changed. As shown in the upper processing path of FIG. 4, the payload flag 226 in which the payload information 222 is embedded is changed and labeled as "PAYLOAD*". The pre-processing microservice 228 acts as a check step to improve the accuracy of understanding of the message by the subsequent microservices. On the contrary, if there is no typo to be fixed or punctuation to be filtered, the payload information generated in step 204 remains the same after the pre-processing microservice 228 is executed. As shown in the lower processing path of FIG. 4, the payload flag 226 in which the payload information 222 is embedded remains the same and is labeled as "PAYLOAD".

In this example, since there is no typo in the message "show me my balance", the pre-processing microservice 228 processes the message through the lower processing path. In another example where the message to be processed contains the words "where can I find Thai-food", the pre-processing microservice 228 is executed to correct the phrase to "where can I find Thai food" by fixing the typo and filtering the punctuation.

After the processing by the pre-processing microservice 228, a new flag "PR" 230 in which the log of the pre-processing microservice 228 is embedded is appended to the fingerprint 203, updating the fingerprint 203 of the message. Herein, "updating the fingerprint" means that the fingerprint 203 is different than that at the end of the previous step. As shown in FIG. 4, regardless of any modification to the payload information, the flag "PR" 230 appears after the payload flag 226. In this example, the fingerprint 203 of the message is updated to be: "HEADER+PAYLOAD+PR". In addition, including the flag "PR" 230, flags added into the fingerprint 203 of the message in the subsequent processes can be collectively referred to as a mutable part. Herein, the "mutable part" means that the part of the fingerprint 203 that is to be updated by the subsequent microservices, and the processing result of the microservices determines whether to update the fingerprint 203 further. That is, in the mutable part of the fingerprint, length, types of flags, and the number of flags vary potentially. The message is then routed to the NLU/Pre-Prop topic of the topic collection (e.g. the topic collection 110 of FIG. 1) by recognizing the existing fingerprint 203 thereof.

Figure 5:
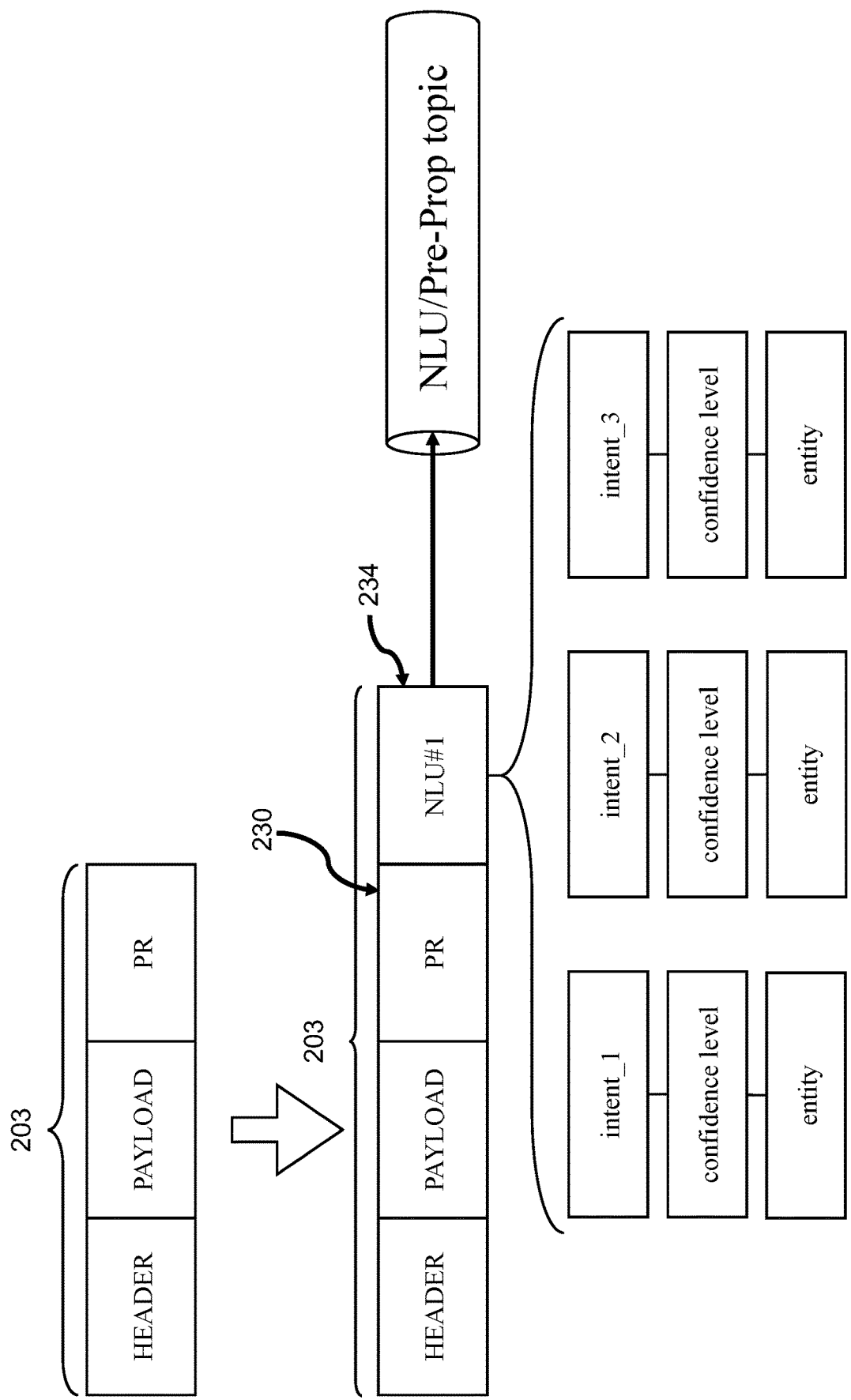
FIG. 5 illustrates the processing of the message by a first natural language understanding (NLU) microservice in the exemplary NLP message-processing platform using the reactive microservice architecture according to the first embodiment of the present invention.

Referring to FIGS. 2 and 5, in which FIG. 5 is a schematic diagram of executing step 208 to process the message by a first NLU microservice 232 in the exemplary NLP message-processing platform. In step 208, the first NLU microservice 232 is configured to recognize the intent of the message (e.g. to compute potential intent of the message). In various embodiment, the first NLU microservice 232 is triggered by the fingerprint, as shown in top of FIG. 5, of the message updated in the previous 206. According to the utterance of the message, the first NLU microservice 232 can classify the intent of the message. For example, the first NLU microservice 232 may classify the intent of the message as: intent_1 having the value of "show balance" with confidence level of 90%; intent_2 having the value of "asking credit card balance" with confidence level of 80%; and intent_3 having the value of "show bank account" with confidence level of 60%. In one embodiment, the first NLU microservice 232 is executed to extract at least one entity (e.g. people, product, number, locations, dates, or the likes) from the utterance of the message.

In this example, no entity is extracted from the message, thus the entity of the message classified by the first NLU microservice 232 is "NULL". In other example, if a message to be processed by the first NLU microservice 232 contains the words "where can I find Thai-food", the first NLU microservice 232 may execute to output the intent of such message as: intent_1 having the value of "ask food" with confidence level of 90%; and intent_2 having the value of "ask drinks" with confidence level of 60%. Moreover, entities of the message might be extracted by the first NLU microservice 232 as "Thai" and "food".

After classifying the intent of the message by the first NLU microservice 232, a new flag "NLU #1" 234 in which log of the first NLU microservice 232 (e.g. containing the intent, the confidence level, and/or the entity with respect to the message) is embedded is appended to the fingerprint 203 after the flag "PR" 230, updating the fingerprint 203 of the message. As shown in FIG. 5, the flag "NLU #1" 234 appears after the flag "PR" 230, and therefore the fingerprint of the message is updated to be "HEADER+PAYLOAD+PR+NLU #1". The message is then routed to the NLU/Pre-Prop topic of the topic collection (e.g. the topic collection 110 of FIG. 1) again by recognizing the existing fingerprint thereof.

Figure 6:
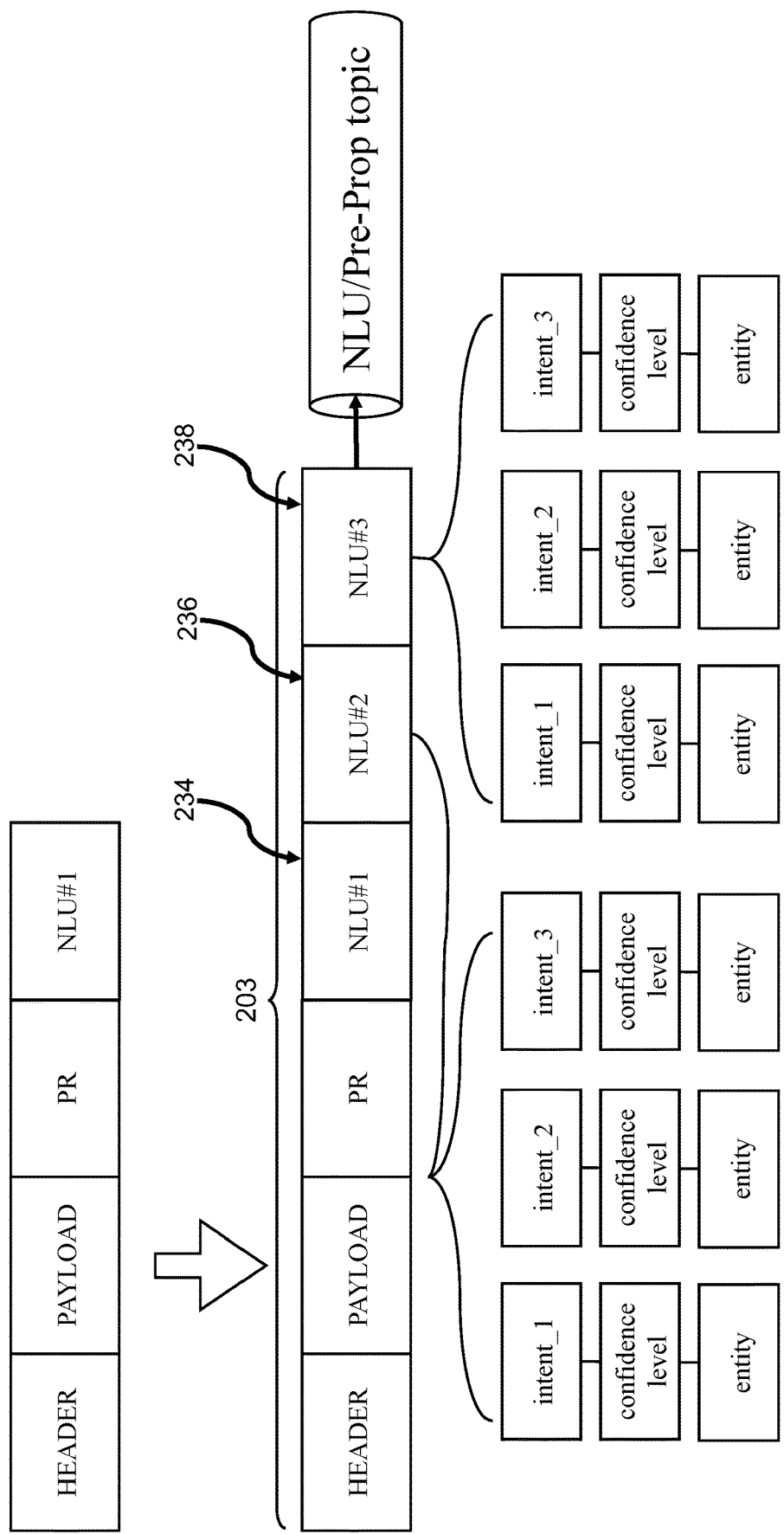
FIG. 6 is a schematic diagram of executing the steps to process the message by a second NLU microservice and a third NLU microservice in the exemplary NLP message-processing platform.

Referring to FIGS. 2 and 6, in which FIG. 6 illustrates steps 210 and 212 for processing the message by a second NLU microservice 236 and a third NLU microservice 238. In steps 210 and 212, the second and third NLU microservices 236 and 238 are configured to recognize the intent of the message (e.g. to compute potential intent of the message), similar to that of the first NLU microservice 232. The second and third NLU microservices 236 and 238 may execute to classify the intent of the message and to generate different results (e.g. also different from that of the first NLU microservice). For example, the second NLU microservice 236 may classify the intent of the message as: intent_1 having the value of "asking virtual money balance" with confidence level of 87%; intent_2 which is "asking body balance" with confidence level of 65%; and intent_3 having the value of "show reward points" with confidence level of 40%. The third NLU microservice 238 may classify the intent of the message as: intent_1 having the value of "asking money income" with confidence level of 95%; intent_2 having the value of "asking financial record" with confidence level of 85%; and intent_3 having the value of "asking practice" with confidence level of 50%. In one embodiment, the second and third NLU microservices 236 and 238 execute to extract at least one entity from the utterance of the message. In this example, no entity is extracted from the message, and thus entity of the message classified by the second and third NLU microservices 236 and 238 is "NULL".

After classifying the intent of the message by the second and third NLU microservices 236 and 238, new flags "NLU #2" 240 and "NLU #3" 242 in which logs of the second and third NLU microservices 236 and 238 are embedded are appended to the fingerprint 230, updating the fingerprint 203 of the message. As shown in FIG. 6, the flags "NLU #2" 240 and "NLU #3" 242 appear after the flag "NLU #1" 234, and the fingerprint 203 of the message is updated to be: "HEADER+PAYLOAD+PR+NLU #1+NLU #2+NLU #3". The message can then be routed to the NLU/Pre-Prop topic of the topic collection (e.g. the topic collection 110 of FIG. 1) again by recognizing the existing fingerprint 203 thereof.

Although the fingerprint 203 illustrated in FIG. 6 shows "NLU #1+NLU #2+NLU #3" arranged in sequence, the arrangement thereof may vary in other cases. More specifically, after step 204 with the appending of the flag "PR" representing the pre-processing by microservice 228, the first, second, and third NLU microservices 232, 236, and 238 can execute at the same time (e.g. in parallel). In one embodiment, the fingerprint 203 of the message may be updated to be: "HEADER+PAYLOAD+PR+NLU #3+NLU #2+NLU #1" or "HEADER+PAYLOAD+PR+NLU #2+NLU #1+NLU #3", which may depend upon when the corresponding NLU microservice returns the timestamp.

Figure 7:
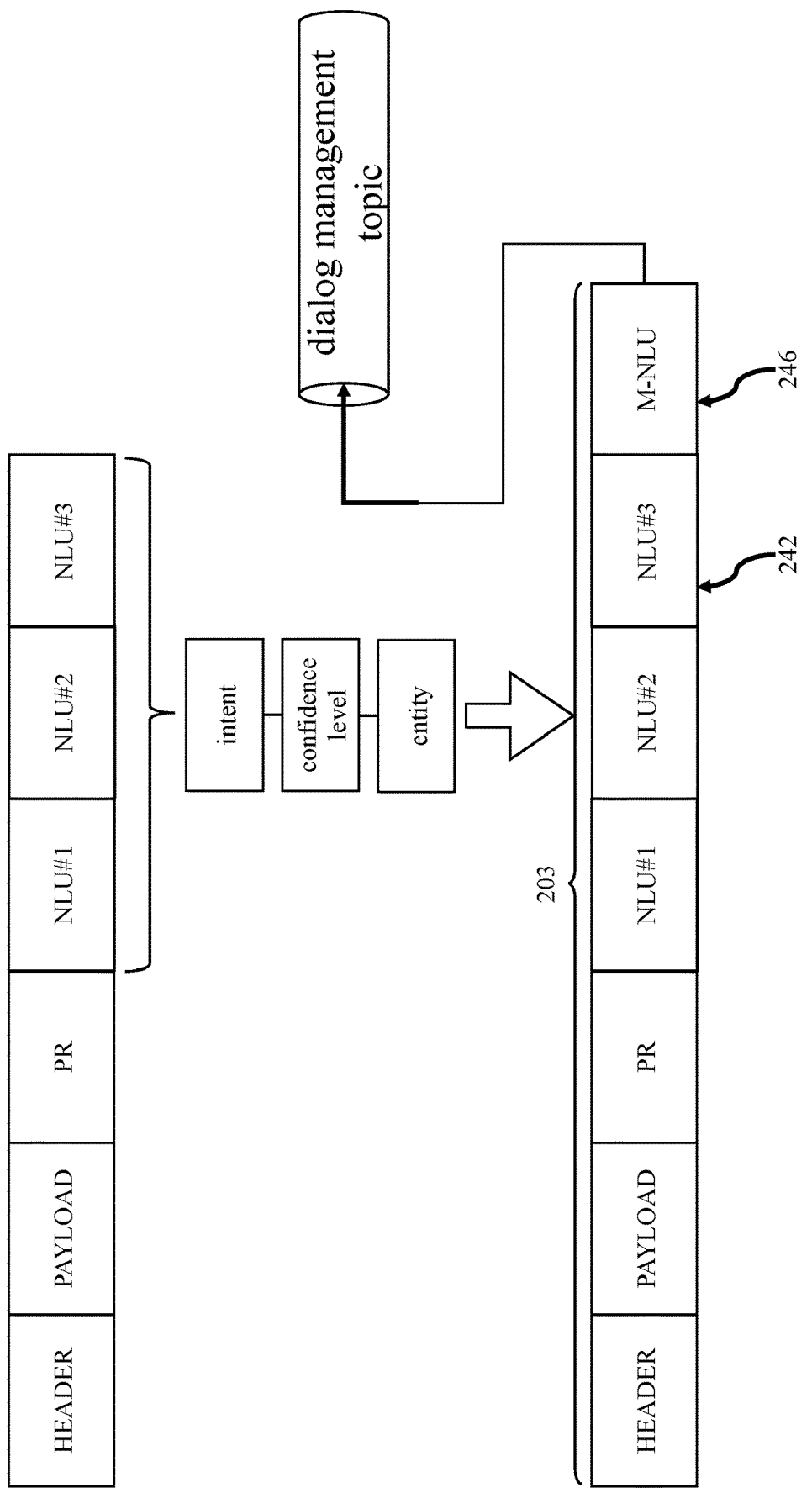
FIG. 7 illustrates the processing of the message by a multi-NLU microservice in the exemplary NLP message-processing platform.

Referring to FIGS. 2 and 7, in which FIG. 7 illustrates step 214 for processing the message by a multi-NLU microservice 244. In step 214, the multi-NLU microservice 244 processes whatever message is available when a timer countdown lapses. For example, during the processing by the NLU microservices in step 208 to step 212, the multi-NLU microservice 244 is in a waiting state for those NLU microservices to complete. As the timer of the multi-NLU microservice 244 countdown lapses, the multi-NLU microservice 244 retrieves the responses from the first, second, and third NLU microservices 232, 236, and 238 and is free of responses from other NLU microservice. The multi-NLU microservice 244 is configured to take an intent-decision approach in determining which NLU microservice (e.g. one of the first, second, and third microservices 232, 236, and 238) computes the intent of the message as complying with the actual intent of the user as most likely. For example, the intent of the message may be determined as "show balance" with confidence level of 95% by the multi-NLU microservice 244, which is the computation result of the first NLU microservice 232 in step 208.

After determining the intent of the message by the multi-NLU microservice 244, a new flag "M-NLU" 246 in which log of the multi-NLU microservice 244 is embedded is appended to the fingerprint 203, updating the fingerprint 203 of the message. As shown in FIG. 6, the flag "M-NLU" 246 is appended after the flag "NLU #3" 242, and the fingerprint 203 of the message is updated to "HEADER+PAYLOAD+PR+NLU #1+NLU #2+NLU #3+M-NLU". The message is then routed to the dialog management topic of the topic collection (e.g. the topic collection 110 of FIG. 1) by recognizing the existing fingerprint 203 thereof. In other embodiments, the message may be routed to other topic for further NLU processing.

Although the fingerprint 203 of the message as illustrated in FIG. 7 is "HEADER+PAYLOAD+PR+NLU #1+NLU #2+NLU #3+M-NLU", the arrangement thereof may vary in other cases. For example, in other embodiments, when a timer of the multi-NLU microservice 244 countdown lapses, if the first and second microservices 232 and 236 are available but the third microservice 238 is not, the multi-NLU microservice 244 may first consume the results from the first and second microservices 232 and 236, thereby updating the fingerprint 203 to be "HEADER+PAYLOAD+ PR+NLU #1+NLU #2+M-NLU". Similarly in other embodiments, the updated fingerprint 203 can be "HEADER+PAYLOAD+PR+NLU #3+M-NLU". Moreover, in the fingerprint 203 of the message as illustrated in FIG. 7, although there are three NLU flags (NLU #1+NLU #2+NLU #3) before the flag "M-NLU" 246, the number of the NLU flags may vary in other embodiments. As aforedescribed, there can be a number of the NLU microservices executing at the same time (e.g. in parallel), and therefore it is possible that the multi-NLU microservice 244 receives responses from more than three NLU microservices, which results in more than three NLU flags before the flag "M-NLU" 246.

Figure 8:
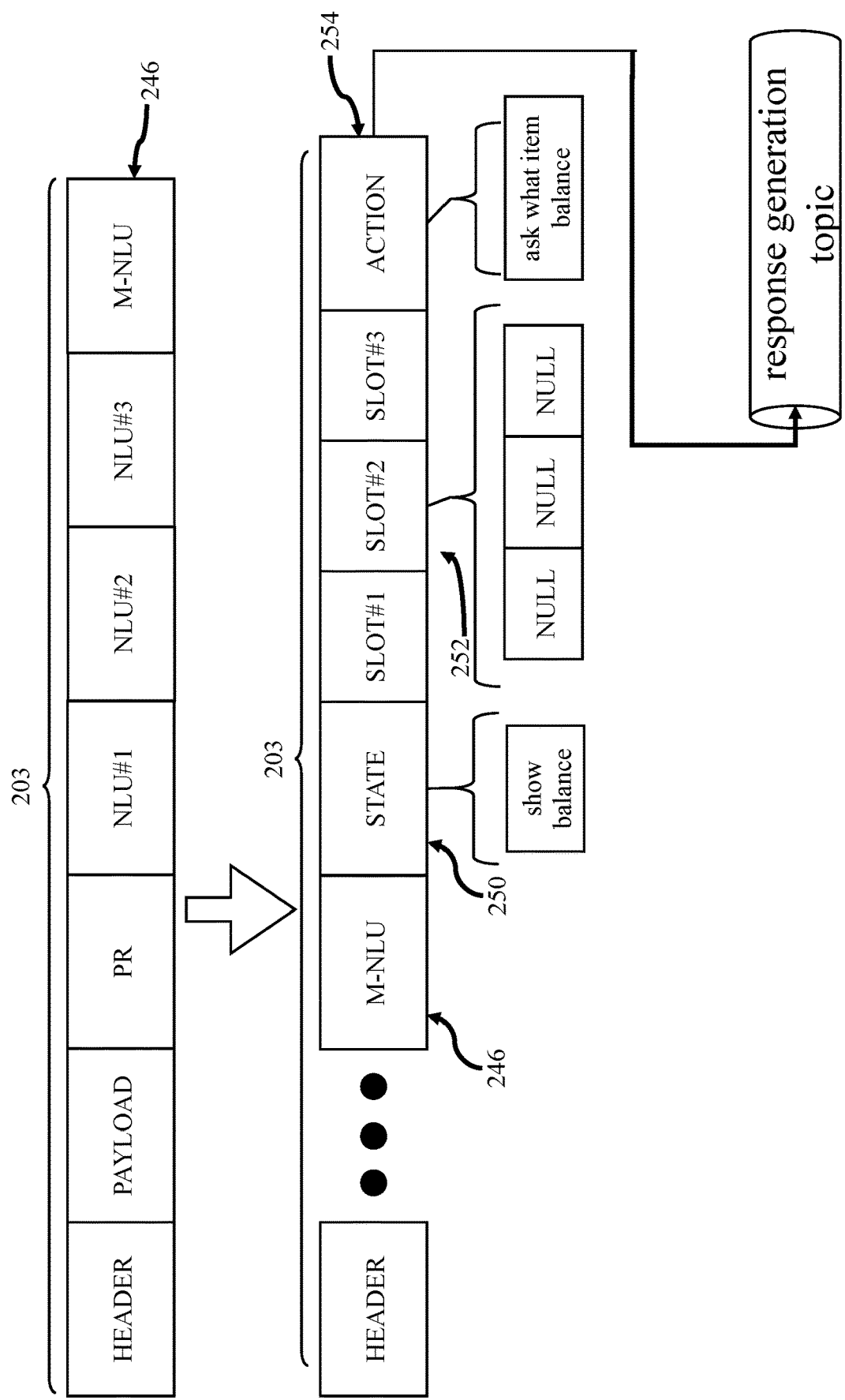
FIG. 8 illustrates the processing of the message by a dialog management microservice in the exemplary NLP message-processing platform.

Referring to FIGS. 2 and 8, in which FIG. 8 illustrates step 216 for processing the message by a dialog management microservice 248. In step 216, the dialog management microservice 248 is configured to proceed when the multi-NLU microservice 244 appends its own flag 246 to the fingerprint of the message. In this regard, the dialog management microservice 248 recognizes the fingerprint 203 of the message, as shown in top of FIG. 8, and processes the message with subsequent service provided in response to the content embedded in the fingerprint 203. In one embodiment, the dialog management microservice 248 makes a decision on the next processing action to be done on the message, which also can be referred to as providing a goal orientation service. More specifically, in response to the intent and the entity of the message (e.g. "show balance" and "null", respectively), the dialog management microservice 248 can determine that the next step is to "ask what item balance".

After determining the next action for the message by the dialog management microservice 248, the fingerprint 203 of the message is appended to new flags 250, 252, and 254. As shown in FIG. 7, the fingerprint 203 of the message now is "HEADER PAYLOAD PR NLU #1 NLU #2 NLU #3 M-NLU STATE SLOT #1 SLOT #2 SLOT #3 ACTION". The flag "STATE" 250 embeds the intent "show balance" of the message therein; each of the flags "SLOT" 252 embeds the entity of the message therein; and the flag 254 "ACTION" embeds the next action "ask what item balance" for the message therein. The message with the updated fingerprint 203 is then routed to a specific topic of the topic collection (e.g. the topic collection 110 of FIG. 1) for further processing, in which the specific topic is determined according to the updated fingerprint 203. In this example, the message is moved to the response generation topic by recognizing the existing fingerprint 203 thereof.

Figure 9:
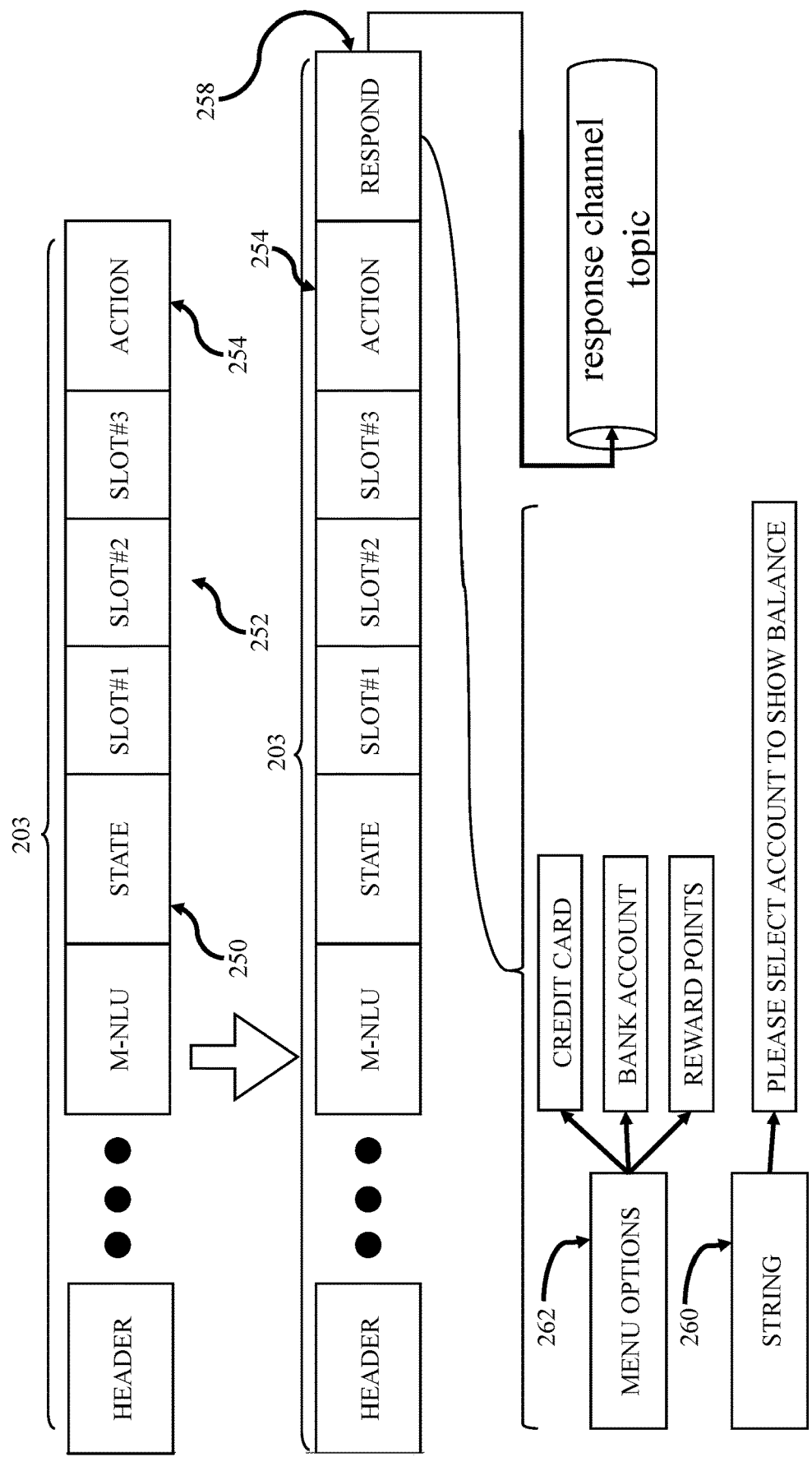
FIG. 9 illustrates the processing of the message by a response generation microservice according to the first embodiment of the present invention.

Referring to FIGS. 2 and 9, in which FIG. 9 illustrates step 218 for processing the message by a response generation microservice 256. In step 218, similar to step 216, the response generation microservice 256 is configured to proceed when the dialog management microservice 248 appends its own flags 250, 252, and 254 to the fingerprint 203 of the message. The response generation microservice 256 recognizes the fingerprint 203, as shown in FIG. 9, of the message and provide the message with subsequent service in response to the content embedded in the fingerprint 203. In one embodiment, the response generation microservice 256 is configured to generate responses to the message, such as creating at least one response string, formatting an output message, and routing the output message to the corresponding channel. In one embodiment, the response generation microservice 256 is executed to generate a response string 260 and a menu 262 with options. In this example, the response string 260 may contain "PLEASE SELECT ACCOUNT TO SHOW BALANCE", and the options of the menu 262 may contain "CREDIT CARD", "BANK ACCOUNT", "REWARD POINTS".

After generating the response for the message by the response generation microservice 256, the fingerprint 203 of the message is appended a new flag "RESPOND" 258 after the flag "ACTION" 254. As shown in FIG. 9, the fingerprint 203 of the message now is "HEADER PAYLOAD PR NLU #1 NLU #2 NLU #3 M-NLU STATE SLOT #1 SLOT #2 SLOT #3 ACTION RESPONS". The flag "RESPONSE" 258 embeds the response to the message therein. In one embodiment, the message with the updated fingerprint 203 is then routed to a response channel topic for replying the user via the corresponding channel. In other embodiments, the message with the updated fingerprint 203 is then routed to the dialog management topic for further processing, such as recording dialog, managing dialog, or checking if there is any additional request. The determination of the next process (e.g. next step) to the message depends on the updated fingerprint 203. Once the message is determined to be routed to a response channel topic, the response string 260 or the menu 262 is output to the user. The user would receive the response, and then next interaction may begin. Herein, "output to the user" may mean that the output response is transmitted from the processing server system to a computer processor being used by the user for displaying to the user.

As can be seen from above, no orchestrator is needed to handle microservice interactions in the microservices architecture in accordance to embodiments of the present invention, thus no process blocking or waiting that occur in microservice orchestration and there is no single/multi-point of failure. Instead, the distributed reactive streaming microservices architecture in accordance to embodiments of the present invention allow multiple microservices to consume and process the same message depending upon the fingerprint of the message. By the changing patterns of the fingerprints of the messages, the desired microservices in the reactive microservices architecture are subsequently invoked/triggered/activated to process the messages as their fingerprints are being recognized by the microservices accordingly. This allows the design of logical processing flow of the messages, enabling the non-centralized, self-management, and autonomous data message routing. Furthermore, since the microservices in the distributed reactive streaming microservices architecture can be invoked/triggered/activated autonomously by recognizing the corresponding flag of the fingerprints of the messages, massive parallel processing of the messages is also possible.

Figure 10:
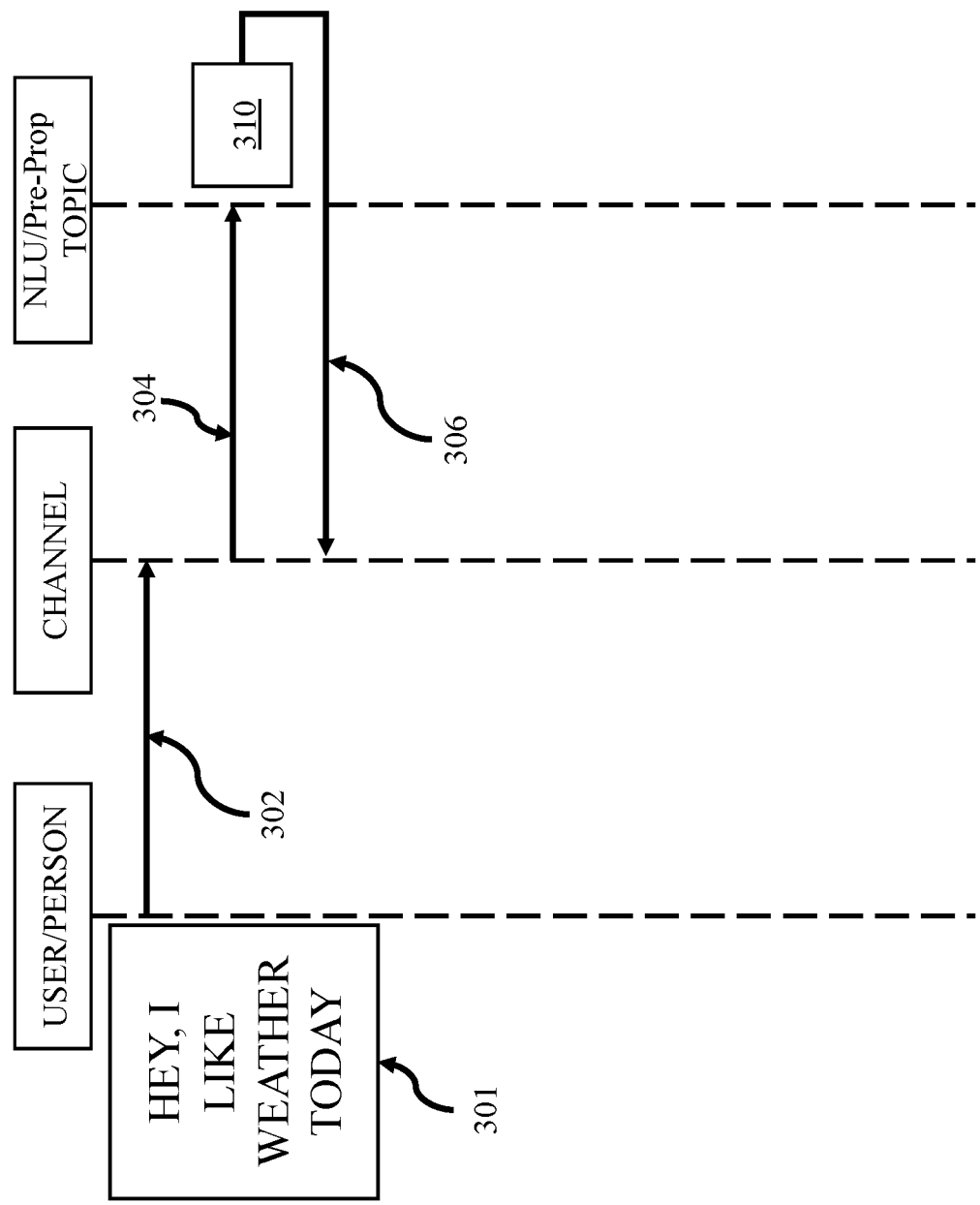
FIG. 10 is a sequence diagram for processing a message according to a second embodiment of the present invention.

FIG. 10 is a sequence diagram for processing a message according to a second embodiment of the present invention. In the exemplary illustration of FIG. 10, steps may be reorganized for parallel execution or reordered according to different requirement. Many aspects of the present embodiments are similar to the first embodiments. For example, the message-processing platform illustrated in FIG. 1 is used in the present embodiment as well, and multi microservices are configured to process messages of conversations. At least one difference between the present embodiment and the first embodiment is that a neural end-to-end microservice 310 is introduced into interaction between a user and the message-processing platform, and such process at least comprises steps 302, 304, and 306.

In step 302, similar to step 202 as afore-described, a message is sent to a channel by a user. For example, a message "hey, I like the weather today" sent from a user is taken as an example herein, which can be treated as "chit-chat".

Figure 11:
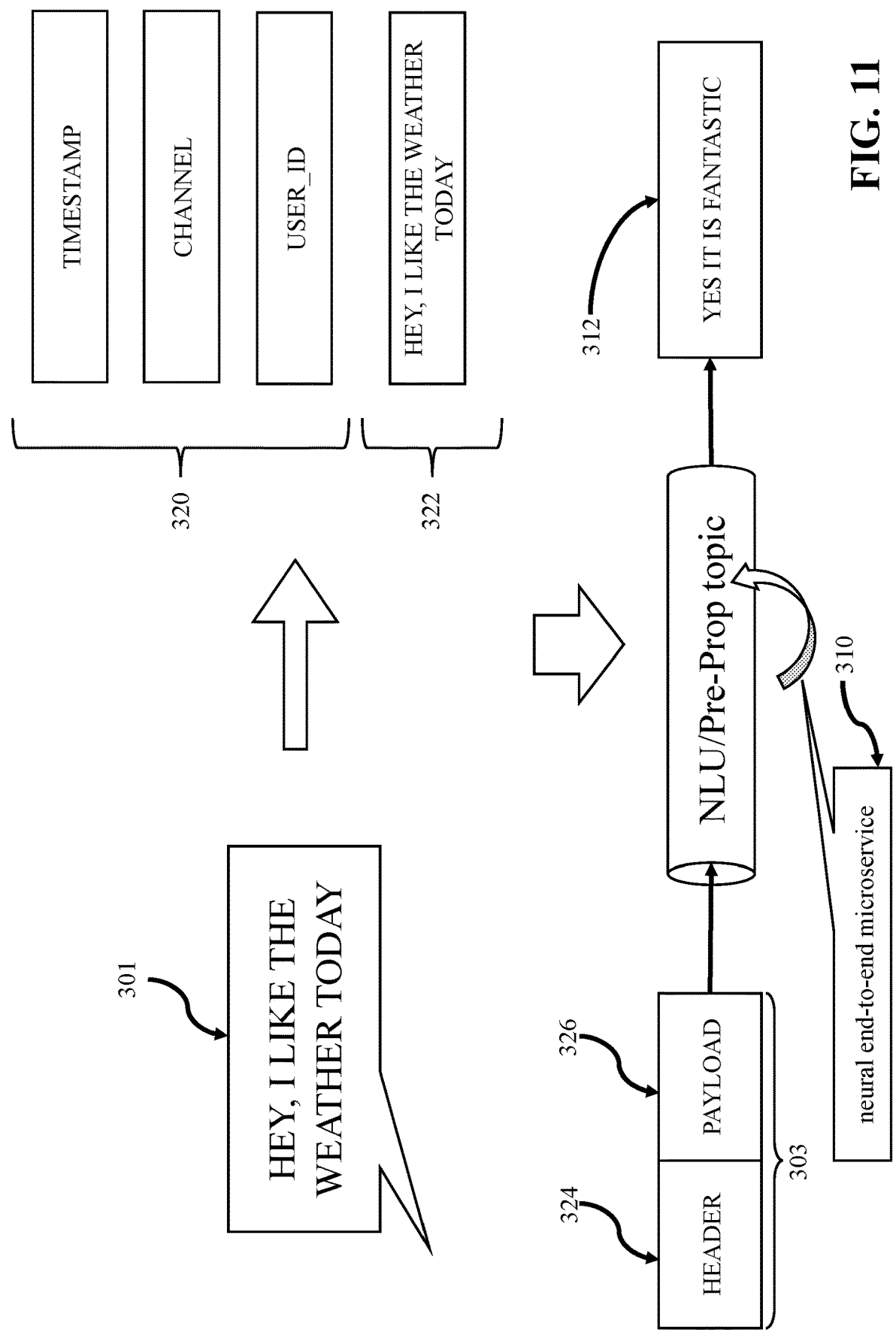
FIG. 11 illustrates the generation of header information and payload information and to provide a response to the message according to the second embodiment of the present invention.

Referring to FIGS. 10 and 11, in which FIG. 11 is a schematic diagram of executing steps 304 and 306 to generate header information 320 and payload information 322 and to provide a response to the message. In step 304, similar to step 204 as afore-described, a decoding process is executed to preliminary generate the header information 320 and the payload information 322 in respond to the message 301. Thereafter, a header flag 324 in which the header information 320 is embedded and a payload flag 326 in which the payload information 322 is embedded are generated in the fingerprint of the message, in which the payload flag 326 appears after the header flag 324, so as to generate a fingerprint 303 of the message 301.

The message with the fingerprint updated by the flags 324 and 326 is routed to an NLU/Pre-Prop topic and step 306 is proceeded. In step 306, a neural end-to-end microservice 310 is configured to provide a response to the message 301. In one embodiment, a neural network embedded in the neural end-to-end microservice 310 can generate a text 312 in respond to the input message 301 without determination to intent of the message 301, because the nature of the input message 301 is chit-chat. The neural end-to-end microservice 310 can be programmed to be able to recognize chit-chat utterances. Accordingly, when the payload information 322 embedded in the payload flag 326 of the existing fingerprint 303 contains the chit-chat message "hey, I like the weather today" 301, the neural end-to-end microservice 310 would recognize the existing fingerprint 301 and be triggered (or activated) to generate text 312 for responding, such as "Yes, it is fantastic."

After the text for responding is determined, the message 301 with the updated fingerprint 303 is routed to a response channel topic for replying the user via the corresponding channel (e.g. the text 312 for responding is output to the user). In one embodiment, after step 304 and prior to step 306, a pre-processing microservice, as afore-described above, is executed to correct the payload information 322 embedded in the payload flag 326, thereby improving the accuracy of the classification of the chit-chat by the corresponding microservice.

Figure 12:
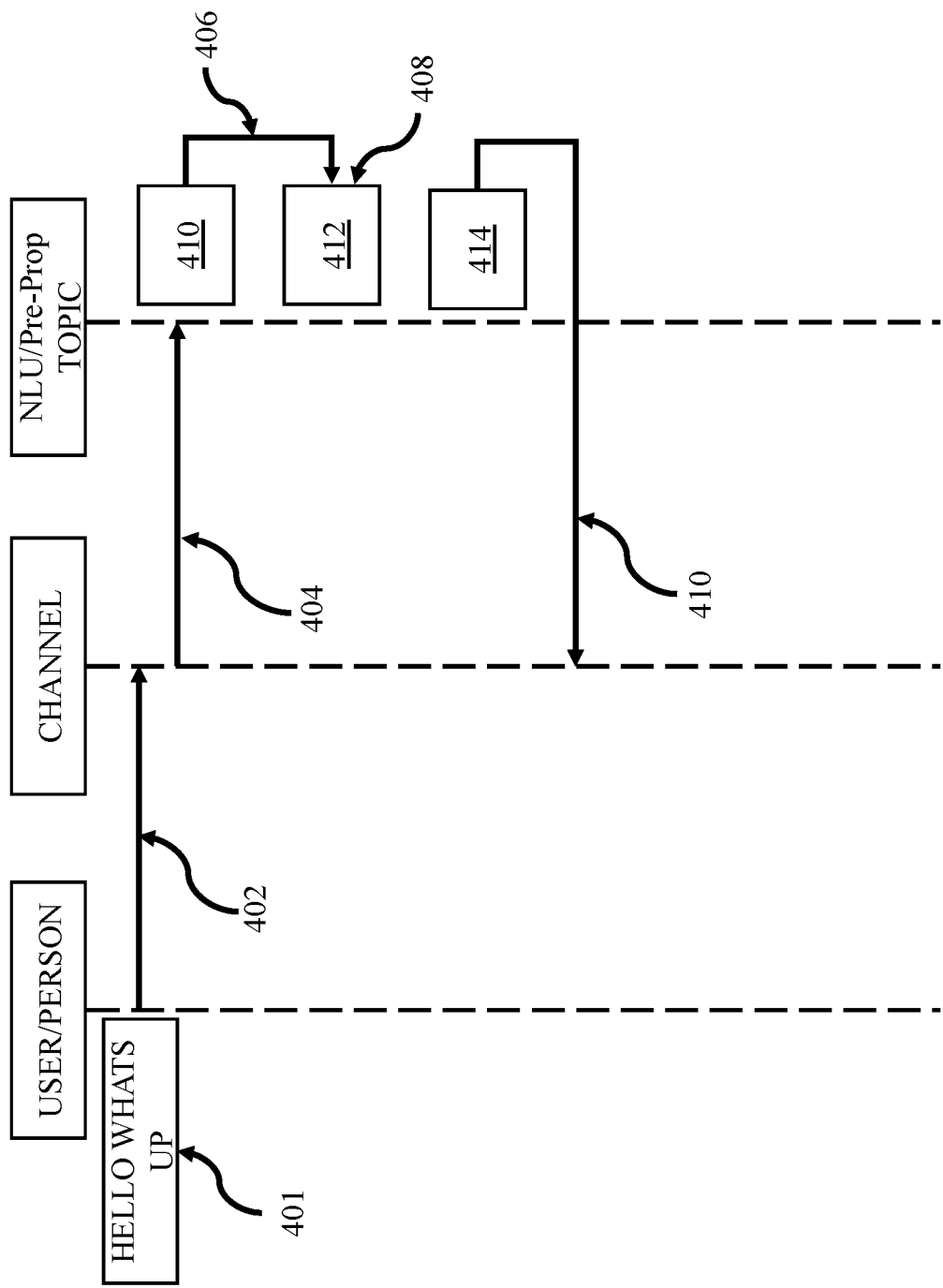
FIG. 12 is a sequence diagram for processing a message according to a third embodiment of the present invention.

FIG. 12 is a sequence diagram for processing a message according to a third embodiment of the present invention. In the exemplary illustration of FIG. 12, steps may be reorganized for parallel execution or reordered according to different requirement. Many aspects of the present embodiment are similar to the first embodiments. For example, the message-processing platform illustrated in FIG. 1 is used in the present embodiment as well, and multi microservices are configured to process messages of conversations. At least one difference between the present embodiment and the first embodiment is that a neural end-to-end microservice 414 is triggered (or activated) when the usual flow as afore-described fails (e.g. NLU microservices cannot continue to process the flow). The processing at least involves with steps 402, 404, 406, 408, and 410.

In step 402, similar to step 202 as afore-described, a message 401 is sent to a channel by a user. A message "hello whats up" 401 sent from a user is taken as an example herein, which is treated as chit-chat. In step 404, similar to step 404 as afore-described, a decoding process is executed to preliminary generate the header information and the payload information in respond to the message 401. Thereafter, a header flag and a payload flag appearing after the header flag can be generated, so as to generate a fingerprint of the message 401. Similar to the first embodiment, the message with the updated fingerprint is routed to the NLU/Pre-Prop Topic for processing by a pre-processing microservice 410 and at least one NLU microservice 412 is configured to determine the intent of the message 401, as in steps 406 and 408 of FIG. 12.

In the cases where the NLU microservice 412 cannot determine the intent of the message 401 (e.g. no NLU microservice can determine the intent of the message 401), the intent of the message 401 is determined to be "unknown" and added to the payload information, which is embedded in the payload flag. The neural end-to-end microservice 412 recognizes the payload flag with the "unknown" intent therein and is triggered (or activated) generate a text for responding.

In the cases where the reply of the NLU microservice 412 is empty or there is no reply from any NLU microservice, the neural end-to-end microservice 414 is triggered (or activated) to generate a text for responding. In one embodiment, a waiting time (e.g. in a range from 2 to 3 seconds) is set in the NLU microservices 412 such that an NLU flag in which lack of intent is embedded is generated when the waiting time lapses, and the neural end-to-end microservice 414 recognizes the fingerprint with the NLU flag in which the lack of the intent is embedded.

The electronic embodiments disclosed herein, particularly the described processing servers, may be implemented using computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the electronic embodiments may be executed in one or more computing devices including server computers, personal computers, laptop computers, mobile computing devices such as smartphones and tablet computers.

The electronic embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Various embodiments of the present invention also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A method for processing a message by a distributed reactive streaming microservices architecture, comprising:
    generating payload information in response to an input message;
    creating a payload flag in which the payload information is embedded, so as to generate a fingerprint of the message comprising the payload flag;
    providing a first service by a first microservice, wherein the first microservice is triggered by recognizing the payload flag;
    updating the fingerprint by appending to the fingerprint a first flag based on a result generated by the first service;
    providing a second service by a second microservice, wherein the second microservice is triggered by recognizing the first flag;
    updating the fingerprint by appending to the fingerprint a second flag based on a result generated by the second service; and
    outputting a response to the message by the processing server system after updating the fingerprint at least once.

2. The method of claim 1, wherein the first microservice is a pre-processing microservice such that the first service is to correct typo or filter punctuation in the payload information.

3. The method of claim 1,
    wherein the first microservice is a natural language understanding (NLU) microservice such that the first service is provided to compute a potential intent of the message, and the potential intent of the message determined by the first microservice is embedded in the first flag; and
    wherein the second microservice is a multi-NLU microservice such that the second service is provided to determine an intent of the message, and the intent of the message determined by the multi-NLU microservice is embedded in the second flag.

4. The method of claim 1, further comprising:
    providing a third service by a third microservice, wherein the third microservice is triggered by recognizing the second flag, and the third microservice is a dialog management microservice such that the third service is provided to determine action to the message based on the intent; and
    updating the fingerprint by appending to the fingerprint a third flag, wherein the action determined by the dialog management microservice is embedded in the third flag.

5. The method of claim 4, further comprising:
    providing a fourth service by a fourth microservice, wherein the fourth microservice is triggered by recognizing the third flag, and the fourth microservice is a response generation microservice such that the fourth service is provided to generate the response based on the action; and updating the fingerprint by appending to the fingerprint a fourth flag, wherein the response generated by the response generation microservice is embedded in the fourth flag, and the outputting the response to the message is performed after updating the fingerprint.

6. The method of claim 1, further comprising:
    providing the second service by the second microservice, wherein the second microservice is triggered by recognizing the payload flag, and the first microservice and the second microservice are different natural language understanding (NLU) microservices such that the first service and the second service are provided to compute potential intent of the message respectively;
    wherein the potential intent of the message computed by the first microservice and the second microservice is embedded in the first flag and second flag respectively.

7. The method of claim 6, further comprising:
    providing a third service by a third microservice, wherein the third microservice is triggered by recognizing the fingerprint updated after the creating the payload flag, and the third service is a multi-NLU microservice such that the third service is provided to determine intent of the message; and
    updating the fingerprint by appending to the fingerprint a third flag, wherein the intent determined by the multi-NLU microservice is embedded in the third flag.

8. The method of claim 1, wherein the first microservice is a neural end-to-end microservice such that the first service is provided to generate a text in respond to the message through a neural network, the text is embedded in the first flag, and the outputting the response is performed based on the text.

9. The method of claim 1, wherein the first microservice is a NLU microservice such that the first service is provided to compute potential intent of the message, and the first flag is generated without computing out the potential intent of the message, wherein the method further comprises:
    providing the second service by the second microservice, wherein the second microservice is triggered by recognizing the first flag, and the second microservice is a neural end-to-end microservice such that the second service is provided to generate a text in respond to the message through a neural network, and the outputting the response is performed based on the text;
    wherein the text is embedded in the second flag.

10. An apparatus for processing a message by distributed reactive streaming microservices architecture, comprising:
    a processing server system configured to generate payload information in response to an input message;
    wherein the processing server system is further configured to generate a payload flag in which the payload information is embedded, so as to generate a fingerprint of the message comprising the payload flag;
    wherein the processing server system is further configured to provide a first service by a first microservice, wherein the first microservice is triggered by recognizing the payload flag;
    wherein the processing server system is further configured to update the fingerprint by appending to the fingerprint a first flag based on a result generated by the first service;
    wherein the processing server system is further configured to provide a second service by a second microservice, wherein the second microservice is triggered by recognizing the first flag;

wherein the processing server system is further configured to update the fingerprint by appending to the fingerprint a second flag based on a result generated by the second service; and wherein the processing server system is further configured to output a response to the message after updating the fingerprint at least once.

11. The apparatus of claim 10, wherein the first microservice is a pre-processing microservice such that the first service is provided to correct typo or filter punctuation in the payload information.

12. The apparatus of claim 10,
wherein the first microservice is a natural language understanding (NLU) microservice such that the first service is provided to compute potential intent of the message, and the potential intent of the message is embedded in the first flag; and
wherein the second microservice is a multi-NLU microservice such that the second service is provided to determine intent of the message, and the intent of the message determined by the multi-NLU microservice is embedded in the second flag.

13. The apparatus of claim 10, wherein the processing server system is further configured to provide a third service by a third microservice, the third microservice is triggered by recognizing the second flag, and the third microservice is a dialog management microservice such that the third service is provided to determine action to the message based on the intent;
wherein the processing server system is further configured to update the fingerprint by appending to the fingerprint a third flag, wherein the action determined by the dialog management microservice is embedded in the third flag.

14. The apparatus of claim 13, wherein the processing server system is further configured to provide a fourth service by a fourth microservice, the fourth microservice is triggered by recognizing the third flag, and the fourth microservice is a response generation microservice such that the fourth service is provided to generate the response based on the action; and
wherein the processing server system is further configured to update the fingerprint by appending to the fingerprint a fourth flag, the response generated by the response generation microservice is embedded in the fourth flag, and the outputting the response to the message is performed after updating the fingerprint.

15. The apparatus of claim 13, wherein the processing server system is further configured to provide the third service by the third microservice, wherein the third microservice is triggered by recognizing the fingerprint updated after the creating the payload flag, and the third microservice is a multi-NLU microservice such that the third service is provided to determine intent of the message;
wherein the intent determined by the third microservice is embedded in the third flag.

16. The apparatus of claim 10, wherein the processing server system is further configured to provide the second service by the second microservice, wherein the second microservice is triggered by recognizing the payload flag, and the first microservice and the second microservice are different natural language understanding (NLU) microservices such that the first service and the second service are provided to compute potential intent of the message respectively;
wherein the potential intent of the message computed by the first microservice and the second microservice is embedded in the first and second flags, respectively.

17. The apparatus of claim 10, wherein the first microservice is a neural end-to-end microservice such that the first service is provided to generate text in response to the message through a neural network, the text is embedded in the first flag, and the outputting the response is performed based on the text.

18. The apparatus of claim 10, wherein the first microservice is a natural language understanding (NLU) microservice such that the first service is provided to compute potential intent of the message, and the first flag is generated without computing out the potential intent of the message;
wherein the processing server system is further configured to provide the second service by the second microservice which is triggered by recognizing the first flag, the second microservice is a neural end-to-end microservice such that the second service is provided to generate a text in respond to the message through a neural network, and the outputting the response is performed based on the text; and
wherein the text is embedded in the second flag.

* * * * *